Patented Dec. 19, 1922.

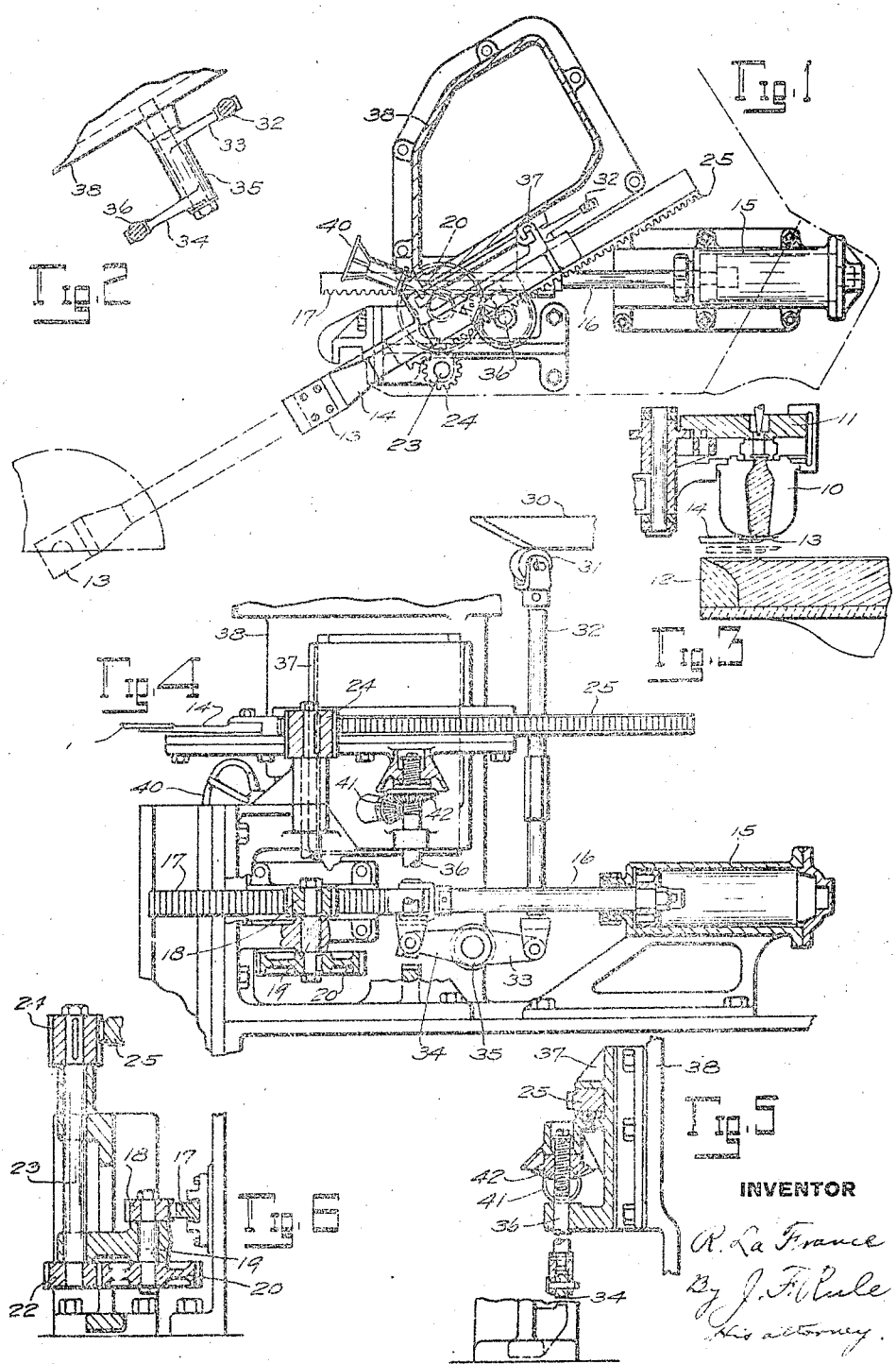

1,439,368

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

GLASS-CUTTING MECHANISM.

Original application filed September 4, 1917, Serial No. 189,458. Patent No. 1,348,365. Divided and this application filed March 13, 1920. Serial No. 365,422.

*To all whom it may concern:*

Be it known that I, RICHARD LA FRANCE, a citizen of the United States, residing at Toledo, in the county of Lucas and State of Ohio, have invented new and useful Improvements in Glass-Cutting Mechanism, of which the following is a specification.

My invention relates to apparatus for cutting molten or plastic glass, and as herein shown is particularly adapted for severing the glass in a suction mold from the body of molten glass from which the charge in the mold has been gathered.

An object of the invention is to provide a simple and practical construction for the purpose stated, wherein the cutter may be actuated by a piston motor, the latter operating the cutter through suitable speed multiplying gearing, whereby quick and positive action of the knife is obtained. A further feature of the invention relates to improved means for giving the knife a downward movement away from the mold before it is withdrawn after the cutting stroke.

Other features and advantages of the invention will appear hereinafter.

This application is a division of my copending application Serial Number 189,458, on which Patent Number 1,348,365 was granted August 3, 1920.

In the accompanying drawings:

Figure 1 is a part sectional plan view of an apparatus embodying the principles of my invention.

Figure 2 is a detail of mechanism through which upward motion is imparted to the knife carrying frame.

Figure 3 is a detail view showing the relation of the cutter to the mold and gathering tank.

Figure 4 is a part sectional elevation of the mechanism shown in Figure 1.

Figure 5 is a sectional detail view of the cutter carrying frame and associated parts.

Figure 6 is a sectional view of the speed multiplying gearing through which motion is transmitted to the cutter.

The invention is herein shown as adapted to an Owens automatic bottle forming machine which comprises a series of blank molds 10 carried on frames or arms 11 on a mold carriage which rotates continuously about a vertical axis so that the molds 10 are brought successively to gathering position over the tank 12. Each mold as it is brought over the tank is lowered into contact with the molten glass in the tank and the glass drawn by suction into the mold. The mold is then lifted to the Figure 3 position and a cutter blade 13 carried on an arm 14 is projected horizontally to the position shown in full lines in Figure 3, and thereby severs the glass in the mold from the string of glass which extends from the mold to the pool as the mold is lifted. After this operation the knife is moved vertically downward to the broken line position in Figure 3 before it is withdrawn horizontally.

The knife arm 14 is actuated by a piston motor 15 operating through the following mechanism: A piston rod 16 of the motor is attached to a rack 17 in mesh with a pinion 18 on a shaft 19 to which is secured a gear 20. The latter drives a pinion 22 on a shaft 23 on which is a pinion 24 in mesh with a rack 25 to which the knife arm 14 is secured. When fluid pressure is admitted in front of the motor piston the latter is driven to the right, and through the train of gears just described operates to shoot the blade 13 forward to the operative position shown in broken lines in Figure 1, thereby severing the blank or charge of glass in the mold from the glass in the tank and closing the gathering opening in the bottom of the mold. Before the blade is withdrawn it is given a short vertical downward movement by the following mechanism:

A stationary cam 30 on the machine frame operates through a cam roll 31, vertical rod 32 carrying said roll, rock arms 33 and 34 on a sleeve 35, and vertical rod 36 to lift a frame 37 in which the rack bar 25 is slidably mounted. The frame 37 is mounted for vertical sliding movement on the frame 38.

Through the connections just described, the cam 30 by depressing the roll 31 lifts the cutter. The cam is so positioned that the knife is lifted before being shot forward to sever the glass. The roll 31 runs off the cam to allow the cutter to drop before it is withdrawn horizontally, the weight of the frame 37 and parts carried therewith being sufficient to insure such drop.

The cutter is adjustable up and down by means of a hand wheel 40 on a horizontal shaft journalled in the frame 37, said shaft carrying a bevel pinion 41 in mesh with a bevel gear 42 having a screw threaded connection with the rod 36. When the hand wheel is rotated the rod 36 is moved up or down in the gear 42, thereby adjusting the knife up or down.

Modifications may be resorted to within the spirit and scope of my invention.

What I claim is:

1. In glass handling mechanism, the combination with a cutter blade, of means to impart thereto a straight line reciprocating movement, said means comprising a reciprocating piston motor, and automatic means to move the cutter blade in a direction transverse to said line of movement.

2. In glass handling mechanism, the combination with a cut-off device, of means to reciprocate it, comprising a reciprocating piston motor, speed multiplying gearing between the motor and the cut-off, and means for moving the cut-off in a direction transverse to its direction of reciprocation.

3. The combination of a cut-off blade, a rack secured thereto, a frame in which the rack is mounted for reciprocation in the direction of its length, a piston motor, a rack secured to the motor piston, a gear train between said racks, and automatic means for moving the cut-off in a direction transverse to its plane of reciprocation.

4. The combination of a cut-off blade, a rack secured thereto, a frame in which the rack is mounted for reciprocation in the direction of its length, a piston motor, a rack secured to the motor piston, a gear train between said racks, automatic means for moving the cut-off in a direction transverse to its plane of reciprocation, and means to adjust said frame and cut-off in said transverse direction.

5. In a glass forming machine, the combination with a traveling frame, of a mold carried thereby, means for gathering molten glass from a receptacle into said mold, a cut-off blade, a piston motor, gearing between the motor and blade for advancing the latter across the gathering opening of the mold and thereby severing the gathered glass from that in said receptacle, and means for withdrawing the cut-off blade from the mold in a direction perpendicular to its direction of cutting movement.

6. In a glass forming machine, the combination with a traveling frame, of a mold carried thereby, means for gathering molten glass from a receptacle into said mold, a cut-off blade, a piston motor, gearing between the motor and blade for advancing the latter across the gathering opening of the mold and thereby severing the gathered glass from that in said receptacle and for withdrawing the blade, a stationary cam, and means controlled thereby for lifting the blade before it is advanced by the motor and moving said blade downward away from the mold before it is withdrawn by the motor.

Signed at Toledo, in the county of Lucas and State of Ohio, this 8th day of March, 1920.

RICHARD LA FRANCE.